INVENTORS
WARREN G. PALMER,
ROBERT K. HOUSTON,
WILLIAM J. FOWLER, RONALD J. BILLETT
BY Hans G. Hoffmeister
ATTORNEY INVENTORS
WARREN G. PALMER,
ROBERT K. HOUSTON,
WILLIAM J. FOWLER, RONALD J. BILLETT
BY Hans G. Hoffmeister
ATTORNEY INVENTORS
WARREN G. PALMER,
ROBERT K. HOUSTON,
WILLIAM J. FOWLER, RONALD J. BILLETT
BY Hans G. Hoffmeister
ATTORNEY Aug. 8, 1967 W. G. PALMER ET AL 3,335,286

COLOR MONITOR WHICH MEASURES DEVIATIONS FROM D.C. REFERENCE

Filed June 15, 1964 11 Sheets-Sheet 4

ON COLOR

LIGHT

LIGHT

DARK

DARK

INVENTORS
WARREN G. PALMER,
ROBERT K. HOUSTON,
WILLIAM J. FOWLER, RONALD J. BILLETT

BY Hans G. Hoffmeister
ATTORNEY

INVENTORS
WARREN G. PALMER,
ROBERT K. HOUSTON,
WILLIAM J. FOWLER, RONALD J. BILLETT
BY Hans G. Hoffmeister
ATTORNEY Aug. 8, 1967 W. G. PALMER ET AL 3,335,286

COLOR MONITOR WHICH MEASURES DEVIATIONS FROM D.C. REFERENCE

Filed June 15, 1964 11 Sheets-Sheet 6

INVENTORS
WARREN G. PALMER,
ROBERT K. HOUSTON,
WILLIAM J. FOWLER, RONALD J. BILLETT

BY Hans G. Hoffmeister
ATTORNEY

INVENTORS
WARREN G. PALMER,
ROBERT K. HOUSTON,
WILLIAM J. FOWLER, RONALD J. BILLETT
BY Hans G. Hoffmeister
ATTORNEY INVENTORS
WARREN G. PALMER,
ROBERT K. HOUSTON,
WILLIAM J. FOWLER, RONALD J. BILLETT
BY Hans G. Hoffmeister
ATTORNEY INVENTORS
WARREN G. PALMER,
ROBERT K. HOUSTON,
WILLIAM J. FOWLER, RONALD J. BILLETT BY Hans G. Hoffmeister
ATTORNEY INVENTORS
WARREN G. PALMER,
ROBERT K. HOUSTON,
WILLIAM J. FOWLER, RONALD J. BILLETT
BY Hans G. Hoffmeister
ATTORNEY INVENTORS
WARREN G. PALMER,
ROBERT K. HOUSTON,
WILLIAM J. FOWLER, RONALD J. BILLETT BY Hans G. Hoffmeister

ATTORNEY

United States Patent Office
3,335,286
Patented Aug. 8, 1967

3,335,286

COLOR MONITOR WHICH MEASURES DEVIATIONS FROM D.C. REFERENCE

Warren G. Palmer, Saratoga, Robert K. Houston, Santa Clara, William J. Fowler, San Jose, and Ronald J. Billett, Sunnyvale, Calif., assignors to FMC Corporation, San Jose, Calif., a corporation of Delaware
Filed June 15, 1964, Ser. No. 375,071
18 Claims. (Cl. 250—226)

This invention relates to the measurement of color and more particularly to an optico-electronic apparatus and method for the monitoring of the color or shades of articles, to detect deviations in their color from a standard or reference color.

*Brief summary of the invention*

Gradual or progressive deviations in color from a reference color of a continuously produced product are detected, in order that corrections to the product producing apparatus can be introduced, thus bringing the product back to the reference color. A light chopper, optical system, photomultiplier and discriminating circuit produce an A.C. color signal. This signal has one of the two 180° displaced phases, relative to a phase reference A.C. signal. A phase detector converts the A.C. color signal into a D.C. color input signal potential. The D.C. color signal is fed into a paired stage D.C. amplifier, which amplifier is normally balanced by a selected D.C. reference potential. The color signal will be of one polarity or the other relative to the reference signal, depending upon whether the product is "light" or "dark." A "light" or "dark" D.C. control signal is produced when the D.C. amplifier is unbalanced in one direction or the other by the D.C. color input signal. The D.C. amplifier is continuously re-balanced at a rate related by the adjustment of a rate of correction potentiometer. This cyclic unbalancing thru color signals and re-balancing by the rate of correction circuit provides an adjustable error sampling rate.

The unbalanced D.C. pulse output of the D.C. amplifier operates an electronic switch circuit which causes a correction motor to turn in the direction necessary to correct that component of the production apparatus which has resulted in the off color product. As product color approaches the reference color, the color input signal decreases in potential, relative to the reference potential, which brings the product back onto color without overshoot in the production apparatus control.

The light chopper includes a rotating glass disc having an odd number of metal film, mirror surface sectors alternating with clear glass sectors. The disc is inclined at 45° to the light emerging from the product. Diagonally opposed external mirrors alternate direct light to the photosensitive element to form alternate light beams from the same source, without need for a half silvered mirror, grid, or the like.

The method and apparatus of the present invention will be described as an embodiment suitable for monitoring color of continuously moving products, such as sugar, toasted corn flakes, etc., in order to detect deviations from a selected standard color. More specifically, and by way of example, the present invention will monitor the shade of toasted corn flakes, and will provide electric signals suitable for controlling the oven from which the corn flakes emerge, in order to maintain them at a selected shade or degree of brownness. However, it is to be understood that the application of the control system of the present invention to a given product, or to an oven temperature controller, is not critical to the invention. The function of the apparatus of the present invention is to provide color responsive control signals, as will be explained in the detailed description that follows.

It is an object of the present invention to make possible the detection of slight variations in shade or color of articles moving past an inspection station.

It is also an object of the present invention to provide control signals that can be applied for correcting the color or shade of the articles if desired.

It is an object of the present invention to provide an apparatus that can be readily adjusted for a standard or reference color, has a high signal to noise ratio, and is stable in operation.

Another object of the present invention is to provide a balanced D.C. control amplifier which is periodically re-balanced at a controlled rate of balancing or correction, until the articles being inspected are back to standard color.

It is another object of the present invention to provide a control circuit which includes a paired stage balanced amplifier and means for varying the rate of correction output of the circuit, including a variable bias applied to one side of the amplifier, through a time delay circuit.

A further object is to insure that the color control circuit will return to a balanced condition, thereby providing no color correction, and will not run away in in either direction, resulting in spoiling the product by means of over control.

Another object of the present invention is to introduce a time lag into the control signal system, to compensate for the passage of articles from a treatment zone to the inspection station.

It is also an object to provide an optical unit including a light chopper wherein all mirrors are first surface mirrors, no beam splitters being used.

Another object is to provide a light chopper that can be readily duplicated with precision, and is small and light in weight.

The manner in which these and other objects of the present invention may be attained will be apparent from the following detailed description thereof.

Figure 1:
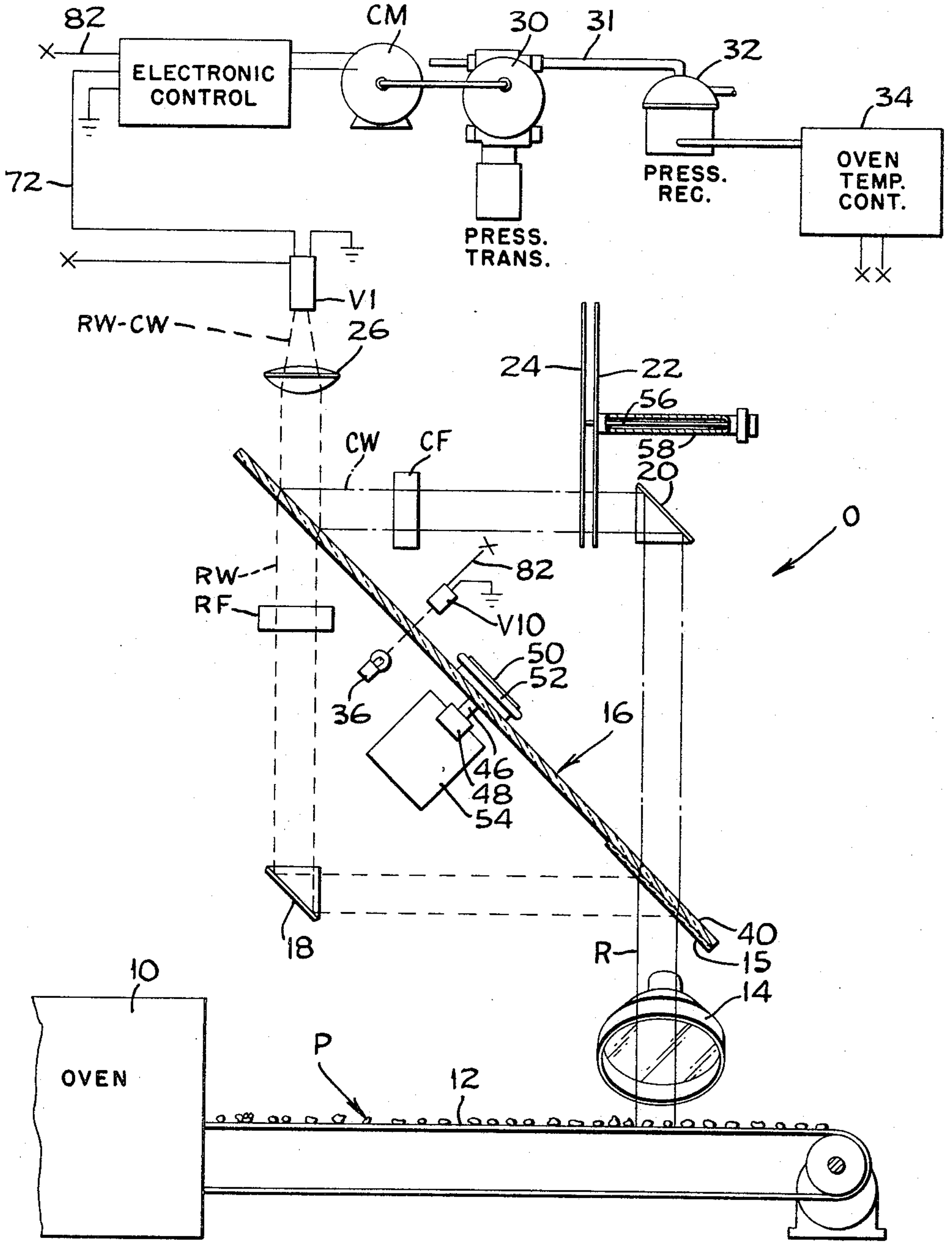
FIGURE 1 is a schematic diagram of a system embodying the invention, as applied to the monitoring of material leaving an oven.
Figure 2:
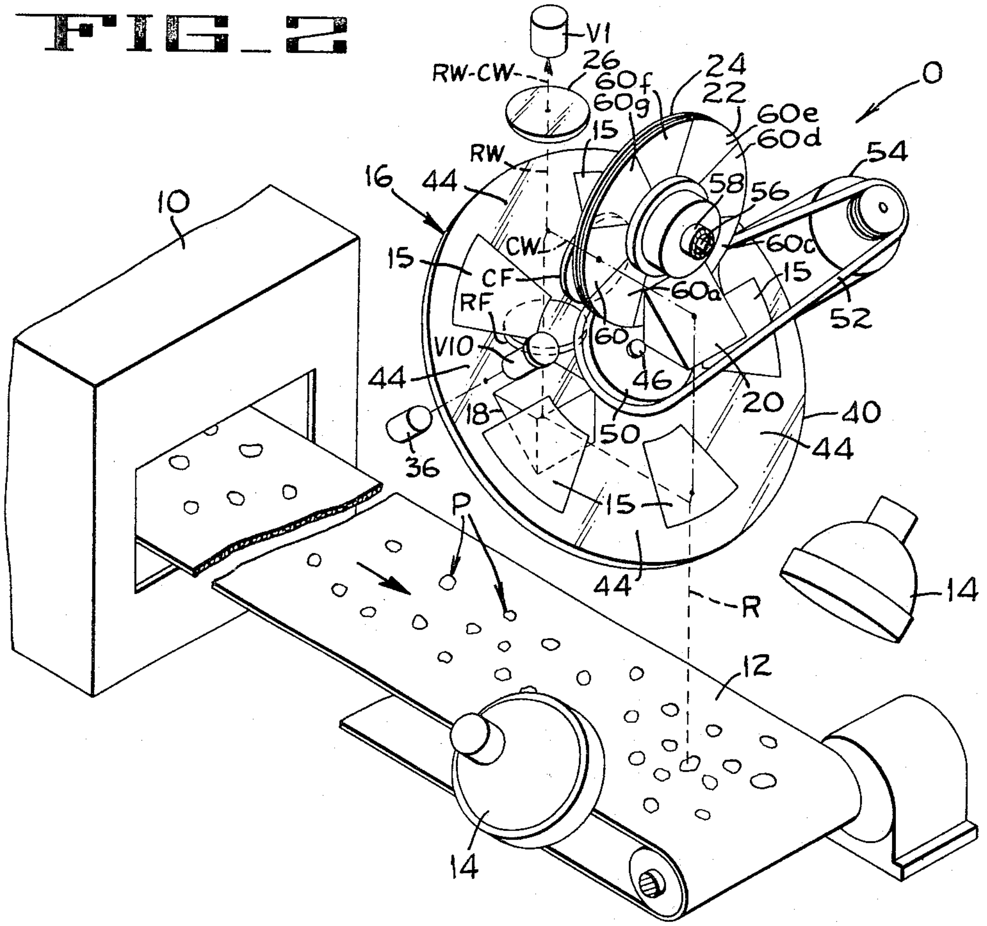
FIGURE 2 is a perspective diagram of the system featuring the optical unit.
Figure 4:
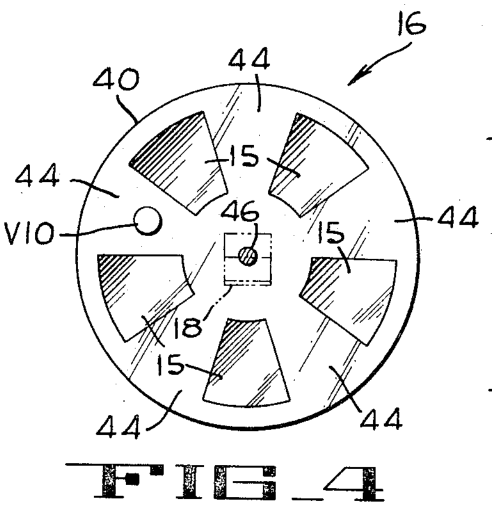
FIGURE 4 is a plan of the chopper disc of the optical unit.

FIGURE 1 is a schematic diagram showing the system of the present invention as applied for controlling an oven that toasts products such as corn flakes for example. The oven 10 has a conveyor 12 running therethrough which carries the product P through and out of the oven. At the inspection station, the color of the product is monitored by the apparatus of the present invention. The product is diffusely illuminated by lamps 14, only one of which appears in FIG. 1, there preferably being two lamps, as seen in FIG. 2. The electronic system of the present invention operates on a phase shift and phase reference principle, and hence an optical unit O is provided which includes a rotary light chopper indicated generally at 16, for producing alternate light paths. The light reflected from the product is alternately reflected by the chopper to a first-surface external mirror in the form of a rear silvered prism 18, and is then transmitted by the chopper to an identical external mirror 20, is reflected by the chopper back to mirror 18, etc. Light reflected from the mirror 18 passes through a reference color filter RF to form a light beam RW, at a reference wavelength. The beam RW is transmitted by the chopper to a photosensitive device V1.

For example, if toasted corn flakes are being monitored, the reference filter RF will peak at a wavelength of about 800 millimicrons. The reflected light from the product in the other path through the optical unit O is transmitted by the chopper 16 and is reflected by the prism mirror 20 through a color filter CF to produce light beam CW at a color sensitive wavelength. The color beam CW is reflected by the chopper to the device V1. The color light beam CW has a wavelength selected so that the variations in the color of the product P from standard substantially effect the intensity of the light transmitted by the color filter CF, 400 millimicrons in the example given. The reference wavelength light beam RW and the color wavelength light beam CW are alternately passed through a lens 26 before striking the photosensitive device V1, which in this case is a photomultiplier tube.

In order to permit the intensity of the reference wavelength beam RW and the color wavelength beam CW to be equalized for articles of a standard color or on a test sample, a coarse attenuating filter 22 and a fine attenuating filter 24 are provided. Adjustment of these filters makes possible the balancing of the output pulses transmitted as color signals from the photomultiplier tube V1.

The pulse signals from the photosensitive device or photomultiplier tube V1 are directed to an electronic control and switching circuit, indicated generally as a box in FIG. 1, the details of which will be explained presently. This circuit controls a correction motor CM, which in the application of the invention illustrated is mechanically connected to an air pressure transmitter 30. Variations in the air pressure in an outlet pipe 31 of the pressure transmitter 30 are transmitted to a pressure receiver 32. The latter operates an oven temperature control device 34, for changing oven temperature and bringing the product P back to color.

The principal purpose of the apparatus of the present invention is to produce correction signals for controlling devices such as the control motor CM. As will be seen, the correction circuit cyclically samples the color control signals, and applies the correction in increments until the color control signals die out. This rate of correction (or sampling) is adjustable. However, as mentioned, the apparatus thereby controlled, such as the pressure transmitter 30, the pressure receiver 32 and the oven temperature control 34, are not critical to the invention and form no part of it. However, and by way of example, the pressure transmitter 30, which is connected to the color correction control motor CM, may be one of Bristol's Series 650 Metagraphic Transmitters, manufactured by the Bristol Company of Waterbury, Conn. Pressure receivers such as 32, which convert these changes in pressure into control functions are also well known in the art, and hence the details of the same need not be explained in order to understand the invention claimed herein.

The optical unit O also includes means for delivering a phase reference signal to the electronic control unit. This signal is delivered by a photosensitive device V10 and a lamp 36, the beam of which is interrupted by the chopper 16, at the same frequency at which the alternate light beams RW and CW are presented to the photosensitive signal forming device V1.

Additional details of the optical unit O will now be described with reference to FIGURES 3–6. The optical unit includes a housing 39, and the chopper 16 is in the housing and includes a clear optical glass rotating disc 40. This disc is formed with five first-surface mirror sections 15 of equal circumferential dimensions, with intervening clear sections 44 of equal circumferential dimensions. One advantage of this construction is that once a mask is accurately constructed, the chopper disc 40 can be coated with dual surface reflecting films using the mask, in a manner which permits precise reproduction of discs of equal operating characteristics, without requiring individual correction of the discs in order to insure their uniformity and precision.

The disc 40 is mounted on a shaft 46 which rotates in a fixed bearing block 48 on anti-friction bearings (not shown). A pulley 50 is mounted on the outer end of shaft 46, and is driven by an O-ring belt 52 from a constant speed motor 54. The disc 40 is turned at 1080 r.p.m. by the motor 54, and since there are five mirror sectors on the disc, the frequency of the pulse generator is 90 cycles per second. The motor 54 is mounted on a motor mounting bracket 55, fastened to the housing by means not critical to the invention.

Figure 6:
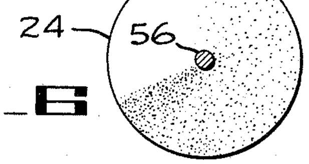
FIGURE 6 is a plan of the fine attenuator.
Figure 5:
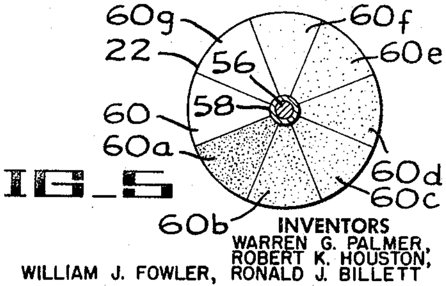
FIGURE 5 is a plan of the coarse attenuator in the optical unit.
Figure 3:
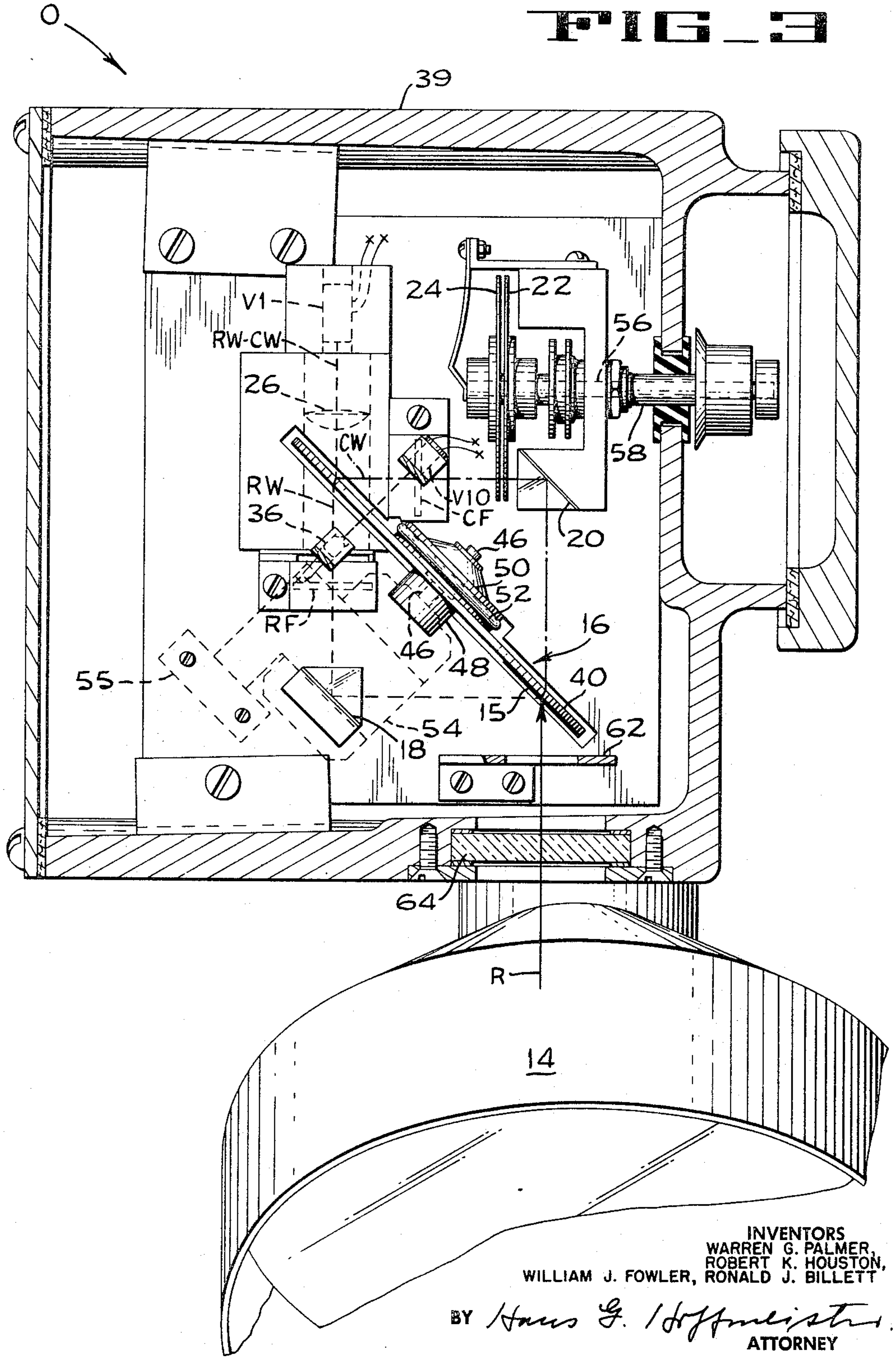
FIGURE 3 is a vertical section through the optical unit.

The course and fine attenuators 22, 24 will now be referred to. The fine attenuator 24 is mounted on a central shaft 56 and the coarse attenuator 22 is mounted on a sleeve shaft 58 surrounding the central shaft 56. Knobs are provided on each shaft for independent adjustment of the attenuators, and the adjustment is maintained by friction devices, the details of which are not critical to the invention. The coarse attenuator 22 is graduated in steps or sectors 60 to 60*g*. These sectors are tinted a neutral shade, such as grey, and their density increase from a clear sector 60 to a most dense sector 60*g*, as best seen in FIG. 6. The fine attenuator 24 can be termed a neutral density optical wedge, in that its opacity changes progressively from a substantially clear zone circumferentially around to the most dense zone. The tint of the fine attenuator 24 is also neutral, such as a grey tint. Mounted within the housing 39 of the optical unit O is an aperture disc 62, for confining the illumination to a definite beam size. The reflected light beam R from the product entering the optical unit passes through a window 64, which excludes dirt from the mechanism, this window being formed of clear optical glass.

The axis of the chopper disc 40 is inclined at 45° to the incoming light beam R, and to the alternating emergent light beams RW—CW entering V1. The external mirrors 18 and 20 have their effective reflecting surfaces (the diagonals of the prisms) centered on the axis of the disc, parallel to the disc, equidistant from the disc and within the confines of the disc. The incident beam R and the beams RW—CW lie in a plane passing through the mirrors 18, 20 and the axis of the disc.

Figure 10:
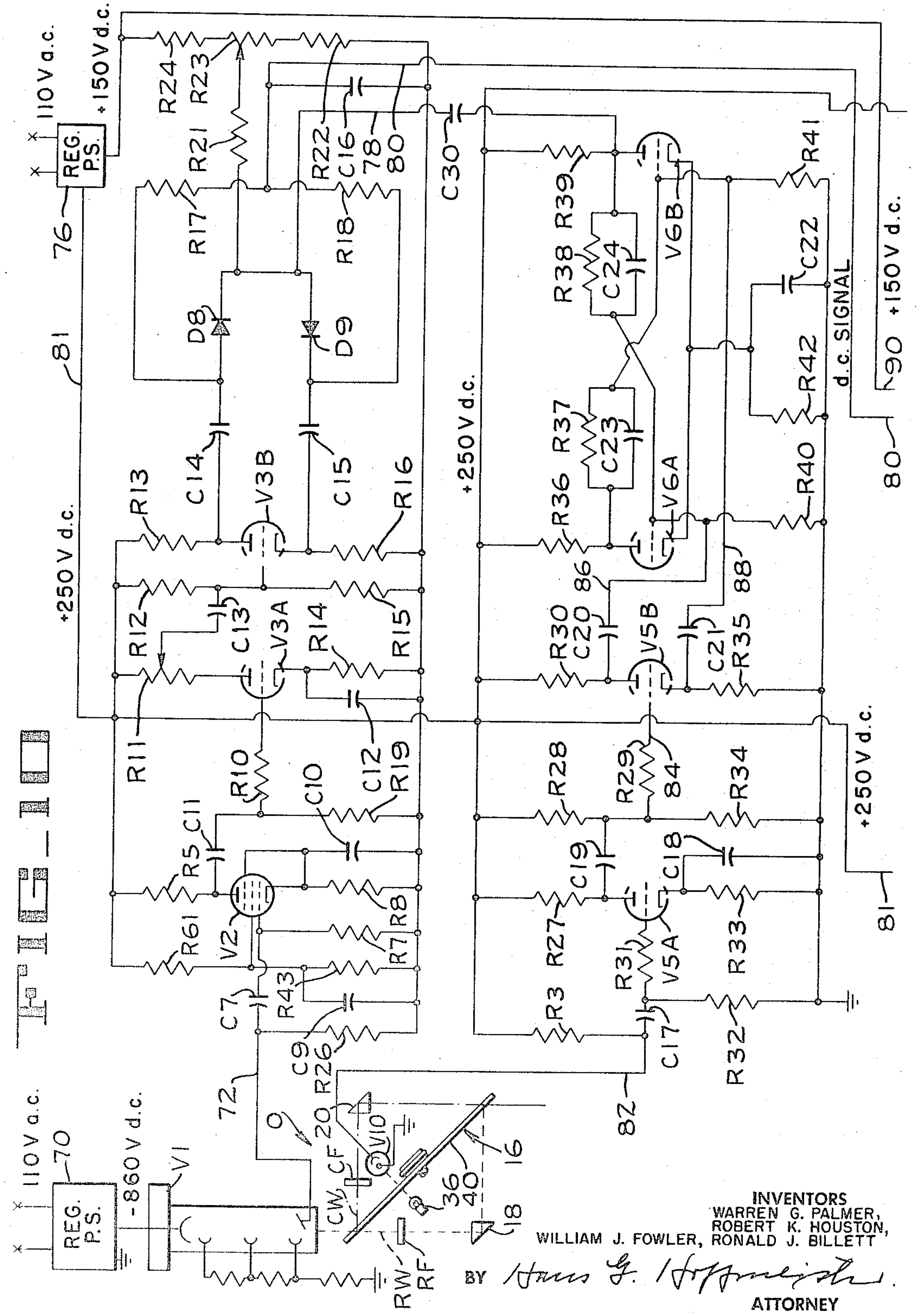
FIGURE 10 is a schematic diagram of the D.C. signal producing circuit.

The electronic signal generating circuit is shown schematically in FIG. 10. A regulated high voltage power supply 70 supplies a high voltage, such as minus 860 volts D.C. to V1, the photomultiplier signal generating tube. The color signal pulses from V1 are delivered by line 72 to the input of a pre-amplifier including tube V2. The amplifier V2 is a conventional voltage amplifier, and the details thereof need not be described. The plate of the amplifier tube V2 is coupled to the grid of the second amplifier tube V3A. The purpose of amplifiers V2 and V3A is to provide an adequate signal and to improve the signal to noise ratio of the circuit. Amplifier V3A includes a gain control potentiometer R11, the slider of which is connected to the grid of a phase inverter V3B. Reversed phase, intermediate A.C. signals from the phase inverter V3B pass through the condensers C14 and C15 and enter a phase detector, including diodes V8 and V9. The phase detector is connected to a regulated power supply 76, which supplies +150 volts D.C. to the circuit through R24, a zeroing potentiometer R23, and R22. These resistances form a voltage divider network. An A.C. phase reference signal is also applied to the phase detector diodes by means of line 78, which leads from a reference signal generating circuit, controlled by a photocell V10, as will be described presently.

In operation, the charge on a D.C. signal condenser C16 increases or decreases depending upon the color of the products relative to the standard color. A D.C. control signal corresponding to the charge on condenser C16 is taken from the phase detector by a lead 80.

The generation of a phase reference A.C. signal will now be described briefly. The light from mirror 36 is eclipsed from the phototube V10 by the mirrored sectors of the chopper disc 40, creating phase reference pulses on an input line 82. Line 82 forms the input to a preamplifier V5A, which shapes the pulse signals. The amplified and shaped pulses then pass through an isolation resistor R29, and form the input to the grid of a phase inverter V5B, by means of line 84. The outputs from the plate and the cathode of the phase inverter V5B pass through condensers C20 and C21, respectively. The plate signals appears on line 86 leading to the grid of tube V6A, which forms one half of a bi-stable multivibrator or flip flop circuit. The cathode signals appear on line 88 leading to the grid of tube V6B of the flip flop circuit. The output is taken from the plate of tube V6B, and forms the phase reference A.C. signal, which is passed on by condenser C30 in line 78 to the phase detector diodes V8 and V9, previously described. The flip flop circuit V6A, V6B is a conventional cathode coupled bi-stable multi-vibrator, which provides a good squaring circuit. These circuits are conventional, and are described in "Electronic Switching, Timing and Pulse Circuits" by Joseph Petitt, published by McGraw-Hill of New York city. The circuit disclosed here is essentially described on page 129 of this publication. It will be noted that since the squaring pulses delivered to line 78 are taken from only one of the plates of the multivibrator circuit, even though the multivibrator vibrates at twice the signal frequency, the square wave on output line 78 will have the same frequency as that of the signal pulses in the color circuit.

As mentioned, the phase detector, which includes diodes D8 and D9 and the D.C. signal condenser C16, generates a D.C. color signal potential, which forms a control signal and which is impressed on a line 80 that leads to a paired stage, D.C. amplifier embodying tube sections V8A and V8B. The D.C. control signal input line 80 is connected to an RC network R62 and C26 and to the grid of the tube section V8A. An A.C. cross coupling circuit including condenser C25 connects the grid of V8A to the grid of V8B of the D.C. amplifier. The plates of these tubes are connected by a line 81 to the regulated power supply 76 at 250 volts D.C. The cathodes of the D.C. amplifier tubes have connected thereacross a polarized relay K2, in series with a "dead zone" potentiometer R52. The dead zone potentiometer R52 determines the amount of difference in conduction between the tube sections V8A and V8B required to energize the polarized relay K2. The polarized relay K2 delivers the prime color correction signals, as will be described presently. In parallel with the polarized relay and its potentiometer R52 is a meter 89 and a resistor R72, which meter can be used for initial adjustment and testing of the instrument.

A rate of correction circuit is provided which varies the bias on the grid of D.C. amplifier tube V8B above or below a selected standard bias, through an RC time delay network. The direction of change in the bias on V8 depends upon whether the articles being inspected are lighter or darker than standard. The D.C. amplifier circuit receives +150 volts D.C. on a line 90 from the power supply 76, and this voltage is supplied across a voltage divider network to ground through resistances R54, R55, R56 and R57. A rate of correction potentiometer R63 is connected across resistances R55 and R56. Adjustment of the potentiometer R63 determines the speed at which the rate of correction circuit rebalances the D.C. amplifier. A current equalizing resistor R64 is connected across resistances R54, R55 and R56, in order that the bias switching operations do not effect the current flowing in the rate of correction circuit, and hence does not change the bias potential.

In the rate of correction circuit, a reference D.C. bias voltage for the tube V8B of the D.C. amplifier is tapped off from between resistors R55 and R56 through two normally closed relay contacts K4–2, K3–2, through R53 and through a Manual-Automatic switch MA. A high bias potential circuit, which is applied to V8B when the product is lighter than standard, is tapped off from between resistors R54 and R55, and is connected to normally open relay contacts K4–1, which connect to the junction of the normally closed relay contacts K4–2 and K3–2. A low potential bias circuit, which is switched into operation when the product is darker than standard, is tapped off from the junction of resistors R56 and R57, and connects to normally open relay contacts K3–1, which contacts lead to the junction of the normally closed relay contacts K3–2 and resistor R53. The operation of these switches will be described presently.

The polarized relay K2 in the D.C. amplifier controls a switch circuit employing a dual triode switching tube V9, having sections V9A and V9B. The switch circuit controls the direction of rotation of the correction motor CM in accordance with whether the product is too dark or too light, relative to its standard color. The cathodes of V9A and V9B are both grounded, and the grid of V9A normally receives a cut-off bias voltage from a −15 volt power supply 92, through resistors R68 and R66. A normally open "dark" relay contact K2–D of the polarized relay K2 (the coil of which is in the D.C. amplifier) connects between R68 and R66, and is connected to ground. The plate of V9A is connected to +250 volts D.C. through a "dark" control relay coil K3. A surge suppressor diode D11 and condenser C33 circuit is provided.

The tube section V9B of the switch is similarly connected. The grid receives bias from the −15 volt D.C. power supply 92 through R69 and R67. A normally open "light" contact K2–L is connected between the junction of these resistors and ground. The contact K2–L is also operated by the coil of the polarized relay K2 in the D.C. amplifier. The plate of V9A is also connected to +250 volts D.C. received from the regulated power supply 76 (FIG. 10) through a "light" control relay coil K4. Surge suppressing diode D12 and condenser C34 are also provided.

Figure 11:
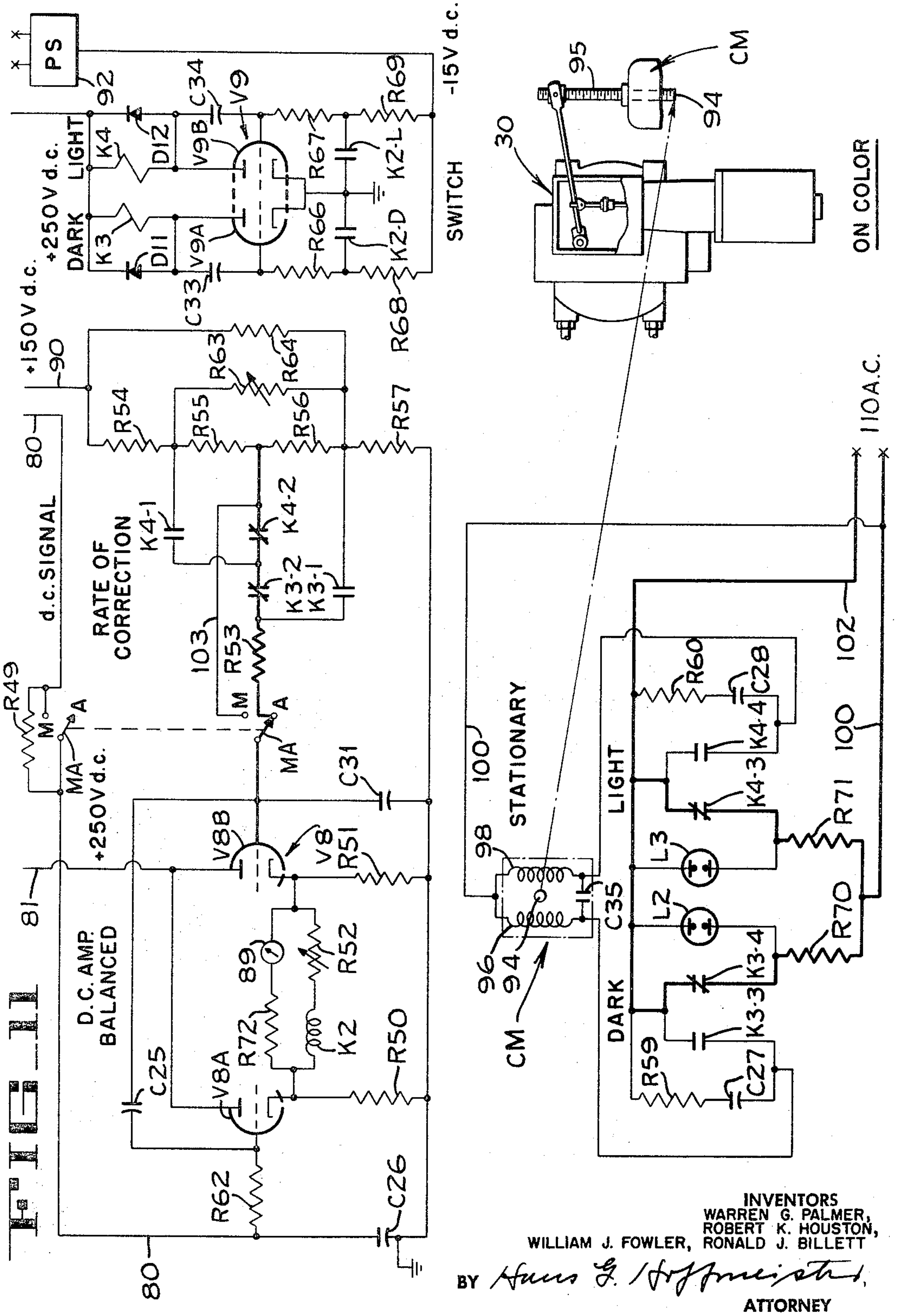
FIGURE 11 is a diagram of the correction and control motor circuit, with the relays in the on color position.
Figure 11A:
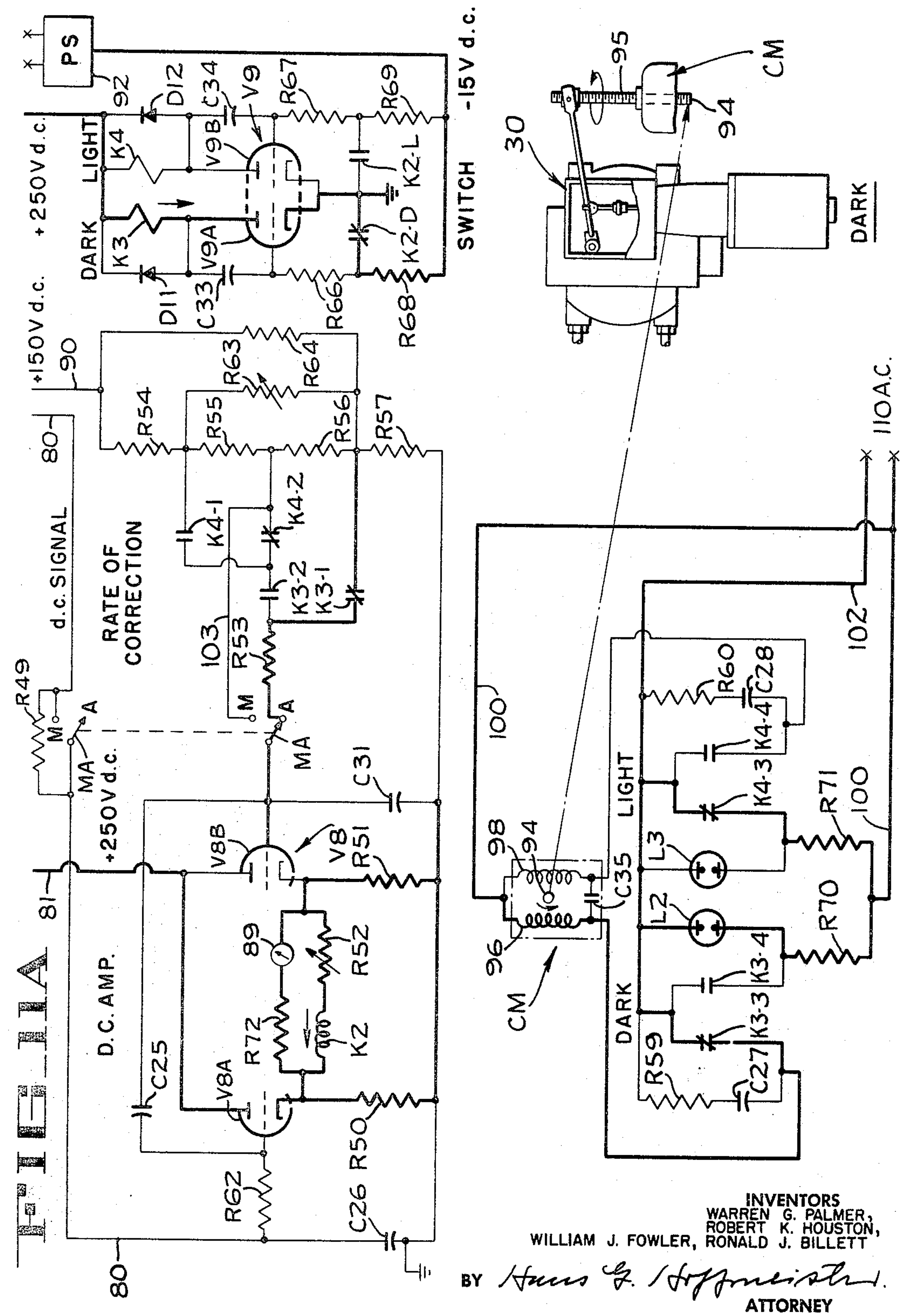
FIGURE 11A is a similar diagram with the relays in the "dark" product position.
Figure 11E:
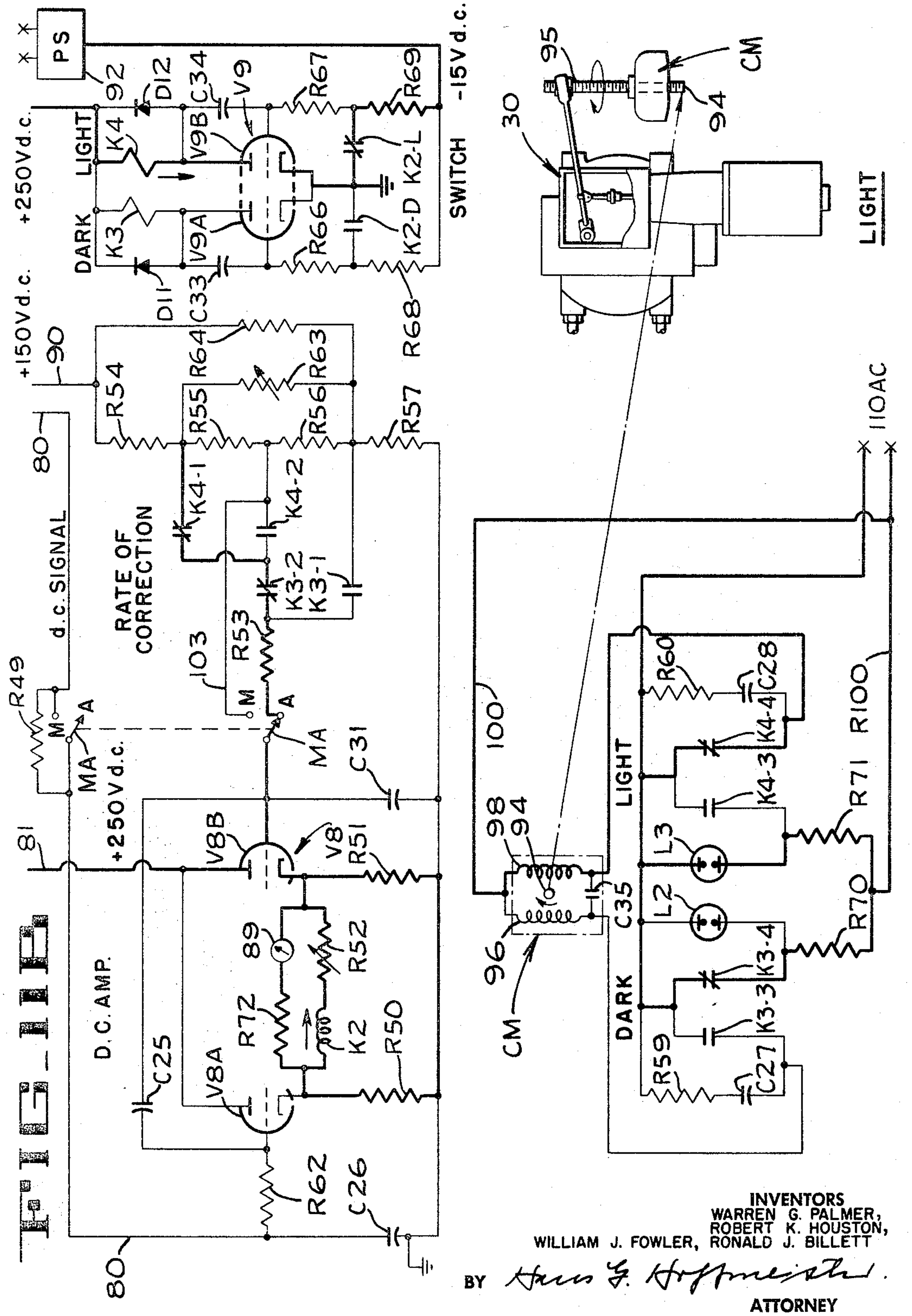
FIGURE 11B is a similar diagram with the relays in the "light" product position.

The switch circuit just described operates a correction motor control circuit, also shown in FIGURES 11, 11A and 11B. The reversible correction motor CM has a shaft 94 which is threaded at 95 for operating the control of the pressure transmitter 30. Details of the pressure transmitter 30 and its setting by the correction motor CM are not part of the present invention and are not critical thereto. The reversible motor CM has a "dark" correction field coil 96 which operates the motor in one direction when the product is too dark, and a "light" correction field coil 98 which operates the motor in the other direction when the product is too light. A starting condenser C35 is connected across the coils at one end, and the other ends of the field coils 96, 98 are connected to a common 110 volt A.C. line 100. The "dark" correction field coil 96 is connected to the other side 102 of the 110 A.C. line through normally open contacts K3–3 of the "dark" relay coil K3 in the switch circuit V9. A dark product indicator light L2 is connected to the 110 A.C. line 100 through R70, but is normally shunted out by normally closed contacts K3–4 of the "dark" relay coil K3 in the switch circuit. R55 and C27 are contact arc suppressors.

The "light" field coil 98 of the reversible correction motor CM is also connected to the A.C. line 102, through normally open relay contacts K4–4 of the "light" correction relay K4 in the switch circuit of V9. A light product indicator light L3 is connected to the 110 volt A.C. line 100 through resistor R71, but is normally shunted out by normally closed relay contacts K4–3 of the "light" color control relay K4, in the switch circuit V9. R60 and C28 are relay arc suppressors.

The operation of the switches in the rate of correction circuit, the switch circuit V9, and the correction motor control circuit, will now be described for three conditions. Assuming that the product is on color, the polarized relay K2 in the D.C. amplifier will be centered, and the various relay circuits will be as shown in FIGURE 11. As to the rate of correction circuit, it will be noted that the reference bias is passed onto the grid of V8B from the junction of R55, R56 through normally closed relay contacts K4–2, K3–2 through R53 and the switch MA. The high and low bias circuits are opened by their respective normally open relay contacts.

With polarized relay K2 centered, and referring to the switch circuit V9, the normally open "dark" contacts K2–D, and the normally open "light" contacts K2–L, remain open. Under these conditions, the two sides of V9 are cut off, or if conducting, conduction through them is balanced. The −15 volt D.C. bias is applied to the grids of both V9A and V9B through resistors R68, R66 and R69, R67 respectively. The bias on these grids may be sufficient to cut off V9A and V9B, or if they are conducting they do not conduct sufficiently to pull in either the relay K3 in the "dark" circuit of V9A, or the relay K4 in the "light" circuit of V9B.

At the motor control circuit, with switch circuit relays K3 and K4 deenergized, normally open contacts K3–3 remain open so that the "dark" correction field coil 96 of the motor CM is not energized. The same applies to the normally open contacts K4–4 in the circuit of the "light" correction field coil 98 of the motor CM. Also both indicator lights L2 and L3 are shunted out by their associated normally closed contacts K3–4 and K4–4 respectively.

Referring to FIG. 11A, if the product is darker than standard, the D.C. amplifier becomes unbalanced, as will be explained presently, energizing the polarized relay K2 in such a direction as to close the "dark" relay contacts K2–D in the V9 switch circuit. This grounds the −15 volts D.C. bias applied to the grid of the switch tube V9A, so that this tube now conducts, energizing the coil of the "dark" relay K3. In the rate of correction circuit, the normally closed relay contact K3–2 in the reference bias voltage circuit now open, and the normally open relay contacts K3–1 close. This supplies bias from the junction of R56 and R57, which connection is closer to ground than the reference bias connection, so that the bias on the grid of D.C. amplifier tube V8B is lowered. As will be seen, after a short time interval this rebalances the D.C. amplifier, and returns the polarized relay K2 to its neutral position.

As just described, the "dark" relay coil K3 in the switch circuit V9 has been energized because the product is too dark. In the motor control circuit, energization of the relay K3 closes the normally open relay contacts K3–3, and energizes the "dark" field coil 96 of the correction motor CM. Now correction of the pressure transmitter 30 begins, in order to decrease oven temperature and hence restore the color of the product to standard. Simultaneously, the normally closed contact K3–4 is opened, and the "dark" indicator light L2 is no longer shunted out, and hence lights up, indicating that a dark correction is being made. When the product is again on color, the D.C. amplifier will be rebalanced, the polarized relay K2 recenters itself, and the "dark" relay K3 drops out, restoring the reference bias to V8B and ending the correction cycle.

FIGURE 11B shows the circuit conditions when the product is too light. The signals to the D.C. amplifier on line 80 will unbalance the amplifier for relative conduction in the opposite direction from the conduction that occurred on "dark" signals, and the polarized relay K2 will now be energized in the opposite direction. This closes the "light" contacts K2–L in V9B of the switch circuit, and raises the grid voltage V9B, causing this section to conduct and energize the "light" relay coil K4 in the rate of correction circuit. When K4 is energized, the normally closed contacts K4–2 in the reference bias line are opened, and the normally open contacts K4–1 are closed, placing a higher bias on V8B in the D.C. amplifier. This soon rebalances the D.C. amplifier, centering the polarized relay K2, which remains centered unless a "light" D.C. control signal continues to be presented to the D.C. amplifier, on the input line 80 of the amplifier.

In the motor correction circuit, when the "light" relay K4 in the switch circuit is energized by the conduction of V9B, the normally open contacts K4–4 are closed, connecting the "light" motor field coil 98 across the 110 volt A.C. line, and causing rotation of the correction motor CM in the opposite direction from the direction of rotation that it assumes when the product is too dark.

This alters the setting of the pressure transmitter 30, and results in increasing oven temperature for bringing the product back to standard color. Simultaneously the "light" indicator L3 lights up, indicating that a "light" correction is being made by the apparatus.

The manual-automatic switch MA is provided in order to facilitate adjustment of the circuit without interference from the rate of correction circuit. When this switch is placed in "Manual" a line 104 is jumped across relay contacts K3–2 and K4–2, so that opening of these contacts by operation of the polarized relay K2 in the D.C. amplifier cannot effect the bias applied to V8B of the D.C. amplifier. Contacts K3–1 and K4–1 are so connected in the rate of correction circuit, that closing of them by the operation of the polarized relay K2 in either direction has no effect on the establishment of the reference bias on V8B of the D.C. amplifier. Setting the switch MA in "Manual" also shunts out resistor R49 in the D.C. control signal line. This is a high value resistor (5 megohms) so that the D.C. control signal is applied at full strength through line 80 to the input of V8A of the D.C. amplifier. Thus, the gain potentiometer R11, and the zeroing potentiometer R23 can be precisely adjusted to obtain reference color conditions. The dead zone potentiometer R52 at the polarized relay K2 can also be adjusted to determine the permissible unbalance in the D.C. amplifier which will not energize the polarized relay K2.

Figure 7A:
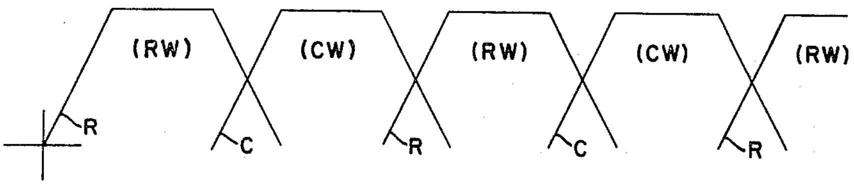
FIGURE 7A is a diagram showing the output of the photosensitive device when the articles being inspected are on color.
Figure 7B:
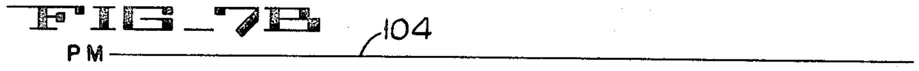
FIGURE 7B is the resultant A.C. color signal for articles that are at standard color.

Reference is now made to the electronic control circuit, and how it applies control signals to the D.C. amplifier. Referring to FIGURE 7A, when the product is on color, the output of the photosensitive element, namely the photomultiplier tube V1, is as shown. Due to the action of the chopper 16, this output is in the form of alternate pulses R and C, the pulses R are those derived from the reference wavelength RW in the optical unit, whereas the pulses C are those derived from the color wavelength CW. The attenuators 22, 24 are adjusted so that these pulses are of equal height. The result of this adjustment is that no resulting A.C. voltage results from the pulses, as indicated by the line 104 in FIGURE 7B.

Figure 8A:
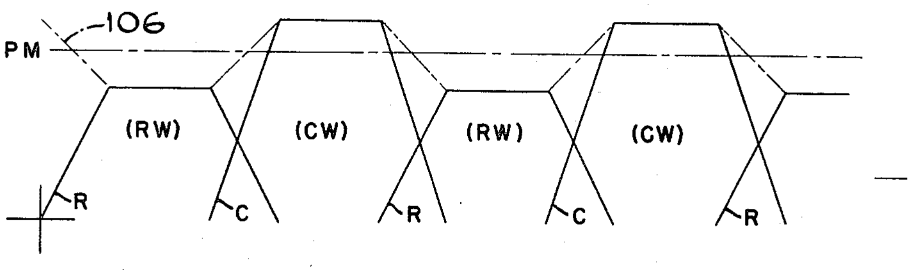
FIGURE 8A shows the pulse wave train output of the photosensitive device for articles lighter than standard.
Figure 8B:
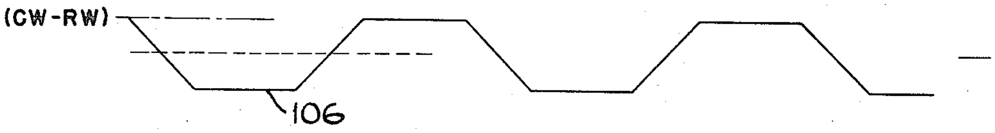
FIGURE 8B is the resultant A.C. color signal for light articles.

If the product is too light, a pulse train like that of FIGURE 8A is provided. Here it can be seen that an A.C. color signal 106 is generated, a development of this signal appearing in FIGURE 8A, and the A.C. signal 106 itself appearing in FIGURE 8B. The signal 106 represents the difference (CW—RW) between the color wavelength and reference wavelength reflectances.

Figure 9A:
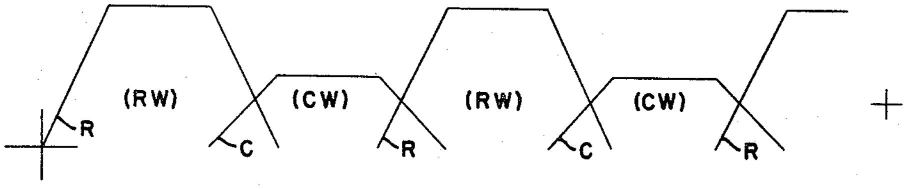
FIGURE 9A shows the pulse wave train output of the photosensitive device for the articles darker than standard.
Figure 9B:
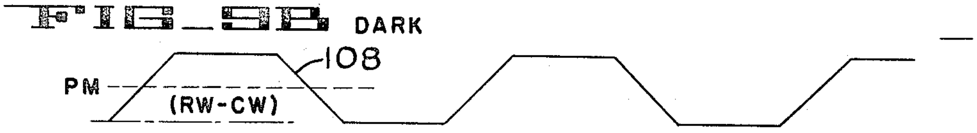
FIGURE 9B shows the resultant A.C. signal.

Similarly, if the product is too dark, a pulse train like that of FIGURE 9A is generated. Here the reference pulses R are of higher potential that the color pulses C, so that an A.C. color signal like that of 108, FIG. 9B, is produced, and supplied to the color amplifier circuit. Signal 108 represents (RW—CW).

Table I gives, by way of example, the values of the various circuit components shown in FIGS. 10 and 11, their values are design details, dependent in part on the signal frequency. In fact, those skilled in the art will recognize that the circuit could be transistorized without affecting its fundamental mode of operation.

*Table I*

| | |
|---|---|
| R3 | 220K. |
| R5, R21, R64, R72 | 100K. |
| R6, R40, R41, R70, R71 | 56K. |
| R7 | 820K. |
| R8, R33 | 1K. |
| R9, R32 | 390K. |
| R10, R29, R31, R62 | 1M. |
| R11, R23 | 25K pot. |
| R26, R61 | 1.5M. |
| R4, R12, R14 | 1.8K. |
| R15, R66, R67 | 470K. |
| R13, R16, R27, R30, R35 | 22K. |
| R17, R18 | 250K. |
| R22 | 47K. |
| R24 | 27K. |
| R25 | 2M. |
| R34 | 560K. |
| R36, R39 | 22K. |
| R37, R38 | 220K. |
| R42 | 2.7K. |
| R43 | 150K. |
| R49, R53 | 5M. |
| R50, R51 | 50K. |
| R52, R63 | 100K pot. |
| R54 | 20K. |
| R55, R56, R57 | 25K. |
| R58 | 39K. |
| R59, R60 | 10 ohms. |
| R68, R68 | 10K. |
| C7, C9, C11, C13, C14, C15, C30 | .25 mf. |
| C10, C12, C23, C24 | 50 mf. |
| C16 | .15 mf. |
| C17, C19, C22 | .05 mf. |
| C18, C22 | 2 mf. |
| C20, C21 | .001 mf. |
| C25, C27, C28 | .5 mf. |
| C26 | 5 mf. |
| C31 | 20 mf. |
| C33, C34 | .005 mf. |
| C35 | .5 mf. |
| V1 | K-1430 photomultipher tube and circuit. |
| V2 | Type 6CB6 tube. |
| V3, V5, V6, V8 | Type 12AU7 tube. |
| V9 | Type 6211 tube. |
| V10 | Type 925 phototube. |

Figure 12:
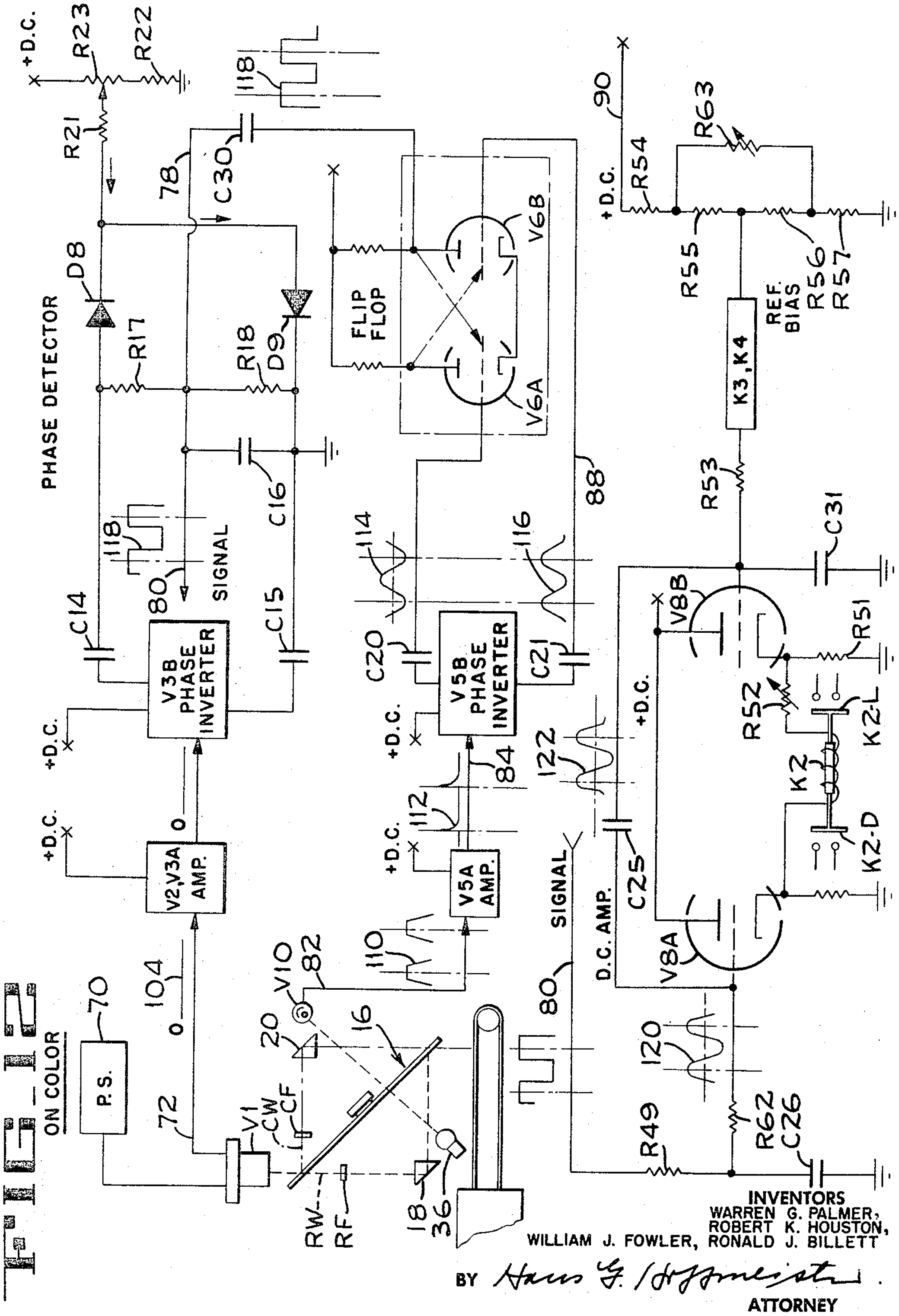
FIGURE 12 is a simplified operational diagram showing the operation of the circuit for articles that are on color.

The operation of the color circuit of FIGURE 10, and the D.C. amplifier and rate of correction circuit of FIGURE 11 appears in the simplified diagram of FIGURE 12. Here it is assumed that the product is on color. The voltage 104, which is a D.C. voltage delivered from the photosensitive tube V1, is shown as an input to the preamplifiers V2, and V3A. Thus, no alternating current output from amplifier V3A is presented to the phase inverter V3B, and hence no signal appears across the phase inverter condensers C14 in the phase inverter circuit.

However, the A.C. phase reference circuit is always in operation. Pulses from the phototube V10 are directed by line 82 to the amplifier V5A. These pulses have the general shape indicated at 110, at the input of amplifier V5A. The amplifier V5A shapes the pulses into spikes, having the same frequency as indicated at 112 on the input line 84 to the phase inverter V5B. The phase inverter provides two A.C. output signals, one from C20, indicated at 114, and the other from C21, indicated at 116. These signals are equal in magnitude but opposite in phase. These are the signals that run the reference circuit flip flop or multivibrator V6A, V6B, as previously described, to produce at the phase detector side of condenser C30, a square wave, phase reference A.C. signal indicated at 118. This signal 118 passes through the phase detector and hence appears on the D.C. signal line 80 of the phase detector, and enters the D.C. amplifier through the grid of V8A, as an A.C. signal 120. The signal 120 is passed on by C25 as a signal 122 to the grid of V8B. Whatever effect the signals 120 on V8A and 122 on V8B have on the conduction of these tubes, such effect is duplicated simultaneously in each tube. Under these conditions, no potential difference across the cathodes of the tubes is created, and the polarized relay K2 remains centered, so that its contact K2–D and K2–L remain open. Thus, the A.C. reference signal, in and of itself, has no effect on the correction circuit when the product is on color. Simultaneously, and as previously described in connection with FIGURE 11, the reference bias is applied to the grid of V8B of the D.C. amplifier, from the junction of R55 and R56.

Figure 12A:
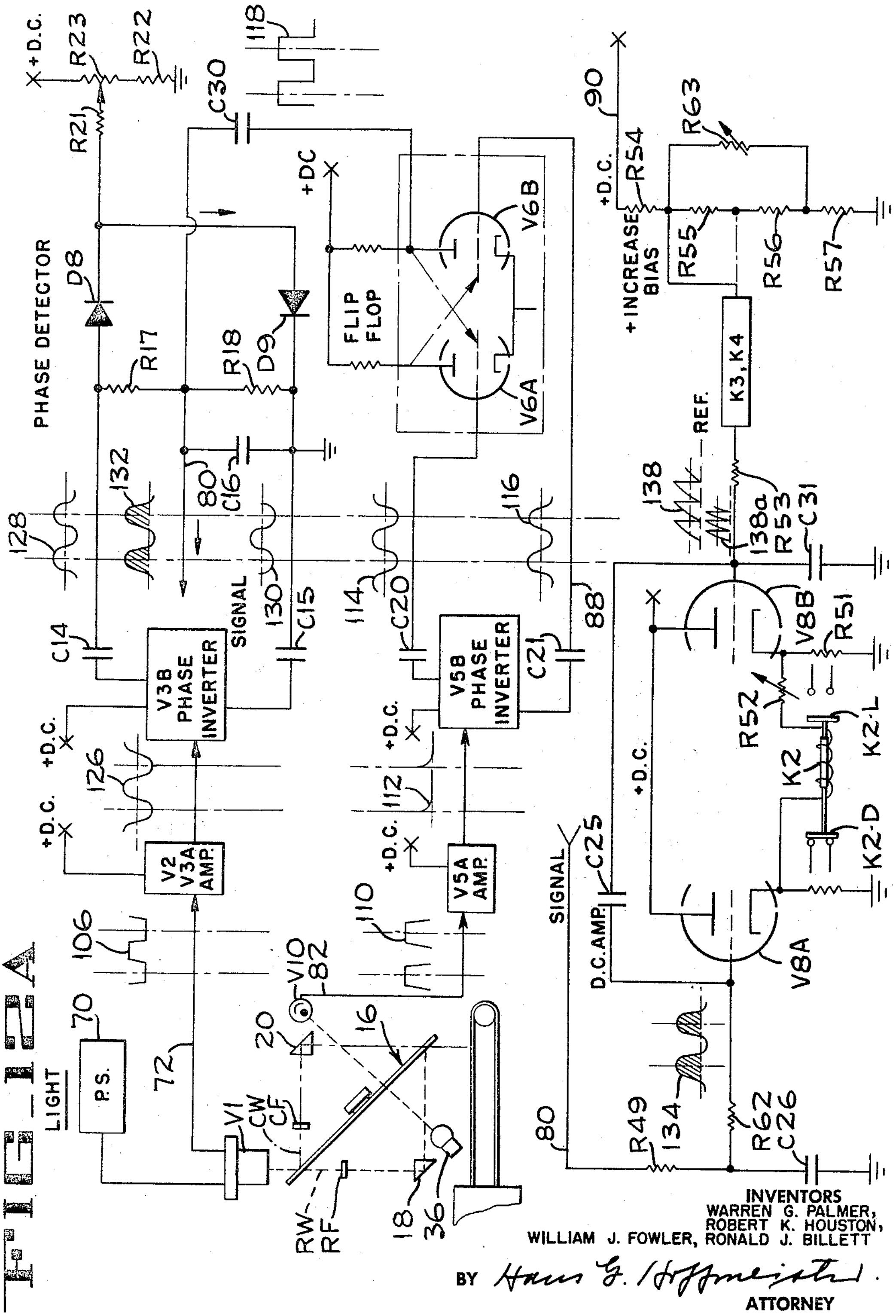
FIGURE 12A is the same diagram for articles that are lighter than standard.

FIGURE 12A indicates the circuit conditions when the product is lighter than standard. The A.C. phase reference signal 118 from the phototube V10 is the same as before, and the description thereof will not be repeated. Now, however, an A.C. color signal 106 is impressed on the amplifiers V2 and V3A. The output of V3A is an amplified A.C. color signal 126, which enters the phase inverter V3B. The outputs of the phase inverter are an intermediate A.C. signal 128 of one phase coming off condenser C14, and an intermediate A.C. signal 130 of the opposite phase, but of equal magnitude, coming off the condenser C15. The phase detector and its diodes D8 combine the intermediate A.C. color signals 128 and 130 with the A.C. phase reference signal 118, to produce a D.C. color control signal 132.

This signal charges the D.C. signal condenser C16 to a potential that is higher than that to which it was previously charged, and a D.C. control signal of increased potential appears as a signal 134 on the grid of V8A of the D.C. amplifier. The potential of the grid of V8A is now raised relative to that of V8B, so that the conduction of V8A is higher than that of V8B. This unbalances the cathode currents of the tube sections, and causes current to flow through the polarized relay K2 in one direction. The circuitry is such that when the product is light, the "light" contacts K2–L of the polarized relay are closed, operating the switch circuit V9 and the motor control circuit, as previously described. Also, the rate of correction circuit contacts are operated to increase the positive bias on the grid of V8B, as previously described, and as indicated in FIGURE 12A. This is accomplished by charging the time delay capacitor C31 through R53 to a higher potential than before, with R53 acting in conjunction with C31 as an RC, or time delay circuit.

Thus, as shown in the curve 138, the potential on the grid of V8B rapidly rises along the curved lines of 138 and reaches a higher level. After a selected time delay, this level becomes sufficient to rebalance the D.C. amplifier, and equalize the conduction in V8A and V8B of that amplifier. This removes the potential difference across the polarized relay K2, the relay centers, and the "light" contacts K2–L of the relay are re-opened. This is represented by the vertical lines in curve 138. The rate of correction circuit contacts now restore the bias for V8B to its reference condition, as indicated by the lower ends of the vertical lines in curve 138.

When the polarized relay is thus re-centered, if the product is still not on color, a D.C. control signal 134 will remain on the grid of V8A, the polarized relay K2 will be re-energized to close the "light" contacts K2–L, and the rate of correction circuit will again increase the bias on V8B through the time delay network. This pulsating bias effect continues as indicated at 138, until there is no D.C. signal component 134 applied to the grid of V8A. When this occurs, the polarized relay K2 again centers and remains centered, returning the circuit to the on color condition of FIGURE 12. The RC time delay circuit R49, C26 in the D.C. signal input connection to V8A of the D.C. amplifier returns the potential of the grid of V8A to its reference value after the phase detector stops generating color correction signals. It also provides a degree of A.C. filtering for the harmonics of the A.C. phase reference signal, as well as providing an RC time constant for smoothing D.C. signal changes.

The "dead zone" potentiometer R52 in series with polarized relay K2, establishes a minimum permissible unbalance potential difference on the grids of the D.C. amplifier, below which no connection is made. This is indicated by the horizontal broken line in curve 138.

Thus, the rate of correction circuit cyclically samples the D.C. color control signal to the D.C. amplifier, and permits the color signals 134 to initiate incremental corrections. Time delays are involved in the sampling, after which the D.C. amplifier is momentarily rebalanced. This prevents over correction, and also permits allowance to be made for the time that elapses between the product color correction that occurs in the oven, and the arrival of the color corrected product at the inspection station. Adjustment of the rate of correction resistance R63 adjusts the steepness or rate of rise of the curved charging lines in curve 138. This alters the sampling frequency, so that R63 makes possible the adjustment of the circuit for the various physical conditions of individual installations, so as to avoid both over-correction, and too long a delay in making the correction, both of which increase the amount of off-color product delivered.

Figure 12B:
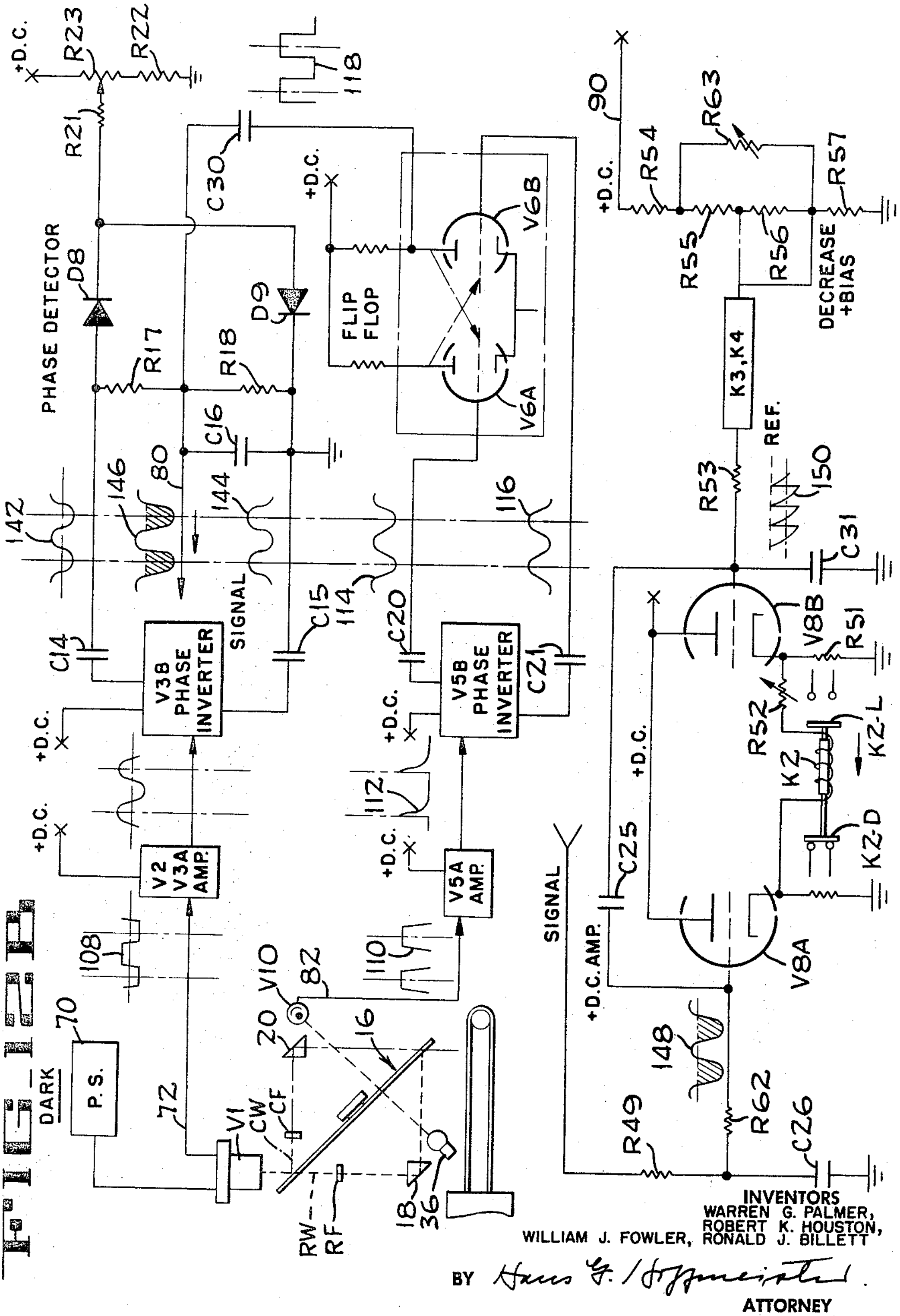
FIGURE 12B is the same diagram for articles that are darker than standard.

FIGURE 12B illustrates schematically the operation of the circuit when the product is darker than standard. An A.C. color signal 108 (previously referred to) from the photomultipher tube V1 now enters the preamplifiers V2, V3A. This signal 108 is opposite in phase from the signal 106, FIGURE 12A, generated when the product is too light (compare FIGS. 9A, 9B with 8A, 8B). The A.C. color signal 108 is amplified into an A.C. color signal 140, which enters the phase inverter V3B. This produces intermediate color signals 142 and 144 of opposite phase. These signals are combined in the phase detector with the A.C. phase reference signal 118, to produce a D.C. color signal 146. The charge potential on the D.C. signal condenser C16 is now lowered, and the average potential of the D.C. control signal 146 is now lower than the reference potential, as compared to the condition of FIG. 12A wherein the product was too light, and the average potential of the D.C. color control signal 132 was higher than the reference potential.

It will be recalled that the reference potential for this signal is established by the zeroing potentiometer R23, FIGURE 10. The D.C. color correction signal 146 produced by the lowering of the charge on condenser C16, appears as a net D.C. potential signal 148 on the grid of the D.C. amplifier tube V8A. This unbalances the cathodes of V8A and V8B, and causes current in the polarized relay K2 to flow in the opposite direction from that occurring in FIGURE 12A, thereby closing the "dark" relay contacts K2–D. This operates the switch V9 and the correction motor circuit for decreasing oven temperature, as previously described. Also, the rate of correction circuit switches the reference bias line to the junction of R56 and R57, which decreases the positive bias on the gird of V8B of the D.C. amplifier. This bias change is in the same direction as the decrease in potential applied to the grid of V8A, by the color control signal 148. The charge on the condenser C31 on the grid of V8B is now reduced, as indicated by the curve 150, until the D.C. amplifier is rebalanced. The polarized relay K2 is then deenergized, re-opening the "dark" contacts K2–D. The bias on V8B then instantaneously returns to the reference value, as indicated by the vertical lines in curve 150.

If a color correction signal 148 is still presented to V8A, the D.C. amplifier is again unbalanced, energizing the polarized relay K2. Discharging of the reference bias condenser C31 is resumed, and the D.C. amplifier is rebalanced again. This process continues cyclically as shown by the curve 150, until no color correction signal appears on V8A. The D.C. amplifier now remains balanced, and the polarized relay coil K2 is again deenergized, but it now remains in this condition so long as the product is on color.

As mentioned, the frequency of switching the bias voltage to the grid of V8B can be controlled by the rate of correction variable resistor R63, FIGURE 11. This controls the timing of the spikes in the RC condenser charging curve 138 (FIGURE 12A) and in the discharging curve 150 (FIGURE 12B). For example, an increase in the resistance of R63 will increase the rebalance frequency, as in the curve 138*a*. This controlled frequency sampling of the D.C. control signal 148 prevents the circuit from running away, and minimizes over correction and under correction by the system, as also mentioned, this sampling mode of operation permits adjustment for the time delay inherent in the physical production set up. As previously mentioned when the product is on color, only the A.C. phase reference signal is applied to the D.C. amplifier, and this signal is applied to both stages thereof so that the polarized relay K2 is unaffected by the on color circuit condition.

The optical unit O employs no beam splitters. Only first surface mirrors are employed, which provides better initial signals 106, 108, and increases the signal to noise ratio. This, in turn, makes it possible to monitor delicate color variations, and to maintain the product precisely at the selected color.

Having completed a detailed description of the invention so that those skilled in the art can practice the same, we claim:

1. Apparatus for monitoring the color of successive articles comprising an illuminated inspection station, a light source for the articles, optical, photosensitive and electronic means for producing a D.C. control signal the potential of which varies in either direction from a D.C. color reference potential, depending upon whether the articles are lighter or darker than standard, a paired stage, normally balanced D.C. amplifier with one stage receiving said D.C. color reference potential and said D.C. control signal, and means for providing the other stage with a selected D.C. reference potential, control means operated by said stages for shifting into one or the other of two control conditions depending on the variation of said D.C. control signal above or below said D.C. reference potential, and switch means responsive to the shifting of said control means to one condition or the other for raising and lowering the D.C. reference potential applied to said other stage of the D.C. amplifier for rebalancing the amplifier.

2. The apparatus of claim 1, wherein said means for providing the D.C. reference potential to said other stage of the D.C. amplifier includes a time delay circuit for delaying the change in said reference potential after said shifting of the switch means.

3. The apparatus of claim 2, wherein means are provided for varying the rate of change in said reference potential, and hence for varying the sampling frequency.

4. Apparatus for monitoring the color of successive articles comprising an inspection station, a light source for the articles, a photosensitive element, optical means for causing the output of said photosensitive element to be an A.C. color signal of one phase for articles lighter than standard and an A.C. color signal of the opposite phase for articles darker than standard, a phase inverter for converting said A.C. color signals into two intermediate A.C. signals of opposite phase, means for providing an A.C. phase reference signal of the same frequency as said color signals, a phase detector, means for applying a D.C. color reference potential to said phase detector, said phase detector comparing said intermediate A.C. signals with said A.C. phase reference signal and producing a D.C. control signal the potential of which varies in either direction from said D.C. color reference potential, depending upon whether the articles are lighter or darker than standard, a paired stage, normally balanced D.C. amplifier with one stage receiving said D.C. color reference potential and said D.C. control signal, and means for providing the other stage with a selected D.C. reference potential, control means operated by said stages for shifting into one or the other of two control conditions depending on the variation of said D.C. control signal above or below said D.C. reference potential, and an A.C. signal coupling circuit for causing the conduction of both stages to vary simultaneously and equally in response to said A.C. phase reference signal, when there is no D.C. control signal received by said one amplifier stage.

5. The apparatus of claim 4, including switch means responsive to shifting of said control means to one condition or the other for raising or lowering the D.C. reference potential applied to said other stage of the D.C. amplifier for rebalancing the amplifier.

6. The apparatus of claim 5, wherein said means for providing the D.C. reference potential to said other stage of the D.C. amplifier includes a variable time delay circuit for varying the sampling frequency.

7. Apparatus for monitoring the color of successive articles comprising an inspection station, a light source for the articles, a photosensitive element, a reference filter for passing light at a wavelength wherein the intensity of the reflectance from the articles remains substantially constant over a selected color range, a color filter for passing light at a wavelength wherein the intensity of the reflectances from the articles varies substantially over the selected color range, optical means for causing the output of said photosensitive element into an A.C. color signal of one phase for articles lighter than standard and into an A.C. color signal of the opposite for articles darker than standard, said optical means comprising a rotating glass chopper disc having an odd number of mirror surfaces formed thereon and spaced by clear sections of equal size, and two first surface mirrors on opposite sides of the chopper disc and on the axis of the disc for alternately directing light through said filters and onto said photosensitive element, a phase inverter for converting said A.C. signals into two intermediate A.C. signals of opposite phase, means for providing an A.C. phase reference signal of the same frequency as said color signals, a phase detector, means for applying a D.C. color reference potential to said phase detector, said phase detector comparing said intermediate A.C. signals with said A.C. phase reference signal and producing a D.C. control signal the potential of which varies in either direction from said applied D.C. color reference potential, depending upon whether the articles are lighter or darker than standard, a paired stage, normally balanced D.C. amplifier with one stage receiving said D.C. color reference potential and said D.C. control signal, and means for providing the other stage with a selected D.C. correction reference signal, control means operated by said stages for shifting into one or the other of two control conditions depending on the variation of said D.C. control signal above or below said D.C. color reference potential, and an A.C. signal coupling circuit for causing the conduction of both stages to vary simultaneously and equally in response to said A.C. phase reference signal, when there is no D.C. control signal received by said one amplifier stage.

8. Apparatus for monitoring the color of successive articles comprising an inspection station, a light source for the articles, a photosensitive element, a reference filter for passing light at a wavelength wherein the intensity of the reflectance from the articles remain substantially constant over a selected color range, a color filter for passing light at a wavelength wherein the intensity of the reflectance from the articles varies substantially over the selected color range, optical means for causing the output of said element to be an A.C. color signal of one phase for articles lighter than standard and into an A.C. color signal of the opposite phase for articles darker than standard, a phase inverter for converting said A.C. signals into two intermediate A.C. signals of opposite phase, means for providing an A.C. phase reference signal of the same frequency as said color signals, a phase detector, means for applying a D.C. color reference potential to said phase detector, said phase detector comparing said intermediate A.C. signals with said A.C. phase reference signal and producing a D.C. control signal the potential of which varies in either direction from said applied D.C. color reference potential, depending upon whether the articles are lighter or darker than standard, a twin stage, normally balanced D.C. amplifier with one stage receiving said D.C. color reference potential and said D.C. control signal, and means for providing the other stage with a selected D.C. correction reference potential, a polarized control relay connected between said stages for energization in one direction or the other depending on the variation of said D.C. control signal above or below said D.C. color reference potential, and an A.C. signal coupling circuit between said stages for causing the conduction of both stages to vary simultaneously and equally in response to said A.C. phase reference signal when there is no D.C. control signal received by said one amplifier stage.

9. The apparatus of claim 5, including switch means responsive to operation of said polarized relay in one direction or the other for raising or lowering the D.C. correction potential applied to said other stage of the D.C. amplifier for rebalancing the amplifier.

10. Apparatus for monitoring the color of successive articles comprising an inspection station, a light source for the articles, a photosensitive element, a reference filter for passing light at a wavelength wherein the intensity of the reflectance from the articles remains substantially constant over a selected color range, a color filter for passing light at a wavelength wherein the intensity of the reflectances from the articles varies substantially over the selected color range, optical means for causing the output of said photosensitive element to be an A.C. color signal of one phase for articles lighter than standard and an A.C. color signal of the opposite for articles darker than standard, said optical means comprising a rotating glass chopper disc having an odd number of dual mirror surfaces formed thereon and spaced by clear sections of equal size, and two first surface mirrors on opposite sides of the chopper disc, said mirrors being centered on the axis of the disc and parallel to the disc for alternately directing light through said filters and onto said photosensitive element, photoelectric means associated with said chopper disc for providing an A.C. phase reference signal of the same frequency as said color signals, circuit means including a phase detector for receiving color signals and said A.C. phase reference signal and producing a D.C. control signal the potential of which varies in either direction from a selected D.C. color reference potential, depending upon whether the articles are lighter or darker than standard, a normally balanced D.C. amplifier receiving said D.C. color reference potential and said D.C. control signal, and means for also providing said amplifier with a selected D.C. correction reference signal, control means operated by said amplifier for shifting into one or the other of two control conditions depending on the variation of said D.C. control signal above or below said D.C. color reference potential, switch means operated by shifting of said control means for raising or lowering said D.C. correction reference signal in response to said D.C. control signal, a time delay impedance corrected to said D.C. correction signal means for delaying the effect of operation of said switch means on the automatic rebalancing of said D.C. amplifier, a time delay impedance for bleeding off any remaining D.C. control potential applied to said D.C. amplifier after the articles are again at standard color, and an A.C. signal circuit in said D.C. amplifier for balancing out the effect of said A.C. phase reference signal when no D.C. control signal is being applied to the amplifier.

11. Apparatus for monitoring the color of successive articles comprising an inspection station, a light source for the articles, a photosensitive element, a reference filter for passing light at a wavelength wherein the intensity of the reflectance from the articles remains substantially constant over a selected color range, a color filter for passing light at a wavelength wherein the intensity of the reflectances from the articles varies substantially over the selected color range, optical means for causing the output of said photosensitive element to be an A.C. color signal of one phase for articles lighter than standard and an A.C. color signal of the opposite for articles darker than standard, said optical means comprising a rotating glass chopper disc having an odd number of dual mirror surfaces formed thereon and spaced by clear sections of equal size, and first surface mirrors on opposite sides of the chopper disc, said mirrors being centered on the axis of the disc and parallel to the disc for alternately directing light through said filters and onto said photosensitive element, photoelectric means associated with said chopper disc for providing an A.C. phase reference signal of the same frequency as said color signals, and circuit means including a phase detector for receiving color signals and said A.C. phase reference signal for producing a D.C. control signal the potential of which varies in either direction from a selected D.C. color reference potential, depending upon whether the intensity of the reflectances from the articles is higher or lower than standard.

12. Apparatus for monitoring colors comprising an inspection station, a photosensitive element, a flat rotating glass chopper disc having an odd number of dual surface mirror sectors formed thereon and spaced by clear glass sectors, all of said sectors being circumferentially equal in dimension, said disc being inclined at 45° to a beam of light emerging from said inspection station, external mirrors spaced from opposite sides of the chopper disc, the reflecting surfaces of said external mirrors being centered on the axis of the disc, parallel to the disc, equidistant from the disc, and within the confines of the disc, said disc axis, the beam of light emerging from said inspection station and the axis of said photosensitive element being coplanar, said photosensitive element being aligned with one external mirror, and said inspection station being aligned with the other external mirror, filters between each external mirror and said chopper disc, said disc and said external mirrors cooperating to alternately direct light through one and then the other of said filters and onto said photosensitive element.

13. The apparatus of claim 12, wherein said chopper disc mirror sectors comprise metal films deposited directly on one face of the disc.

14. The apparatus of claim 12, wherein an attenuator is disposed between one of said external mirrors and the associated filter, said attenuator comprising concentric discs, one disc having a plurality of sectors of increasing density, the other disc being formed to provide an optical wedge of gradually increasing density.

15. The method of monitoring the color of successive articles relative to a standard article color comprising the steps of illuminating the articles, deriving A.C. color signals from the reflectance from the articles, the phase of which depends upon whether the articles are lighter or darker than standard articles, deriving an A.C. phase reference signal having the same frequency as said color signals, combining said color and reference signals to produce a D.C. control signal the potential of which is above or is below a reference potential depending upon whether the articles are lighter or darker than standard articles, and activating a control device in one direction or the other depending upon said D.C. control signal potential.

16. The method of claim 15, comprising the steps of applying said D.C. control signal to one side of a normally balanced paired stage amplifier, applying a reference bias signal to the other side of said amplifier, and activating the control device in accordance with the relative conduction of the two sides of the amplifier.

17. The method of claim 16, including the step of raising or lowering the reference bias signal relative to a standard potential in accordance with the relative conduction of two stages of the amplifier.

18. The method of claim 16, comprising the steps of delaying the change in the reference bias signal, and adjusting the delay to vary the sampling frequency.

References Cited

UNITED STATES PATENTS 3,133,201 5/1964 Rock .............. 250—226

RALPH G. NILSON, *Primary Examiner.*

M. ABRAMSON, *Assistant Examiner.*